United States Patent
Guo et al.

(10) Patent No.: US 8,200,362 B2
(45) Date of Patent: Jun. 12, 2012

(54) NUMERICALLY CONTROLLING APPARATUS WITH STOP POINT SETTING AND REMOVING MEANS

(75) Inventors: Xingui Guo, Davis, CA (US); Yadong Liu, Davis, CA (US)

(73) Assignee: Mori Seiki Co., Ltd., Yamato-Koriyama-shi (JP)

( * ) Notice: Subject to any disclaimer, the term of this patent is extended or adjusted under 35 U.S.C. 154(b) by 412 days.

(21) Appl. No.: 12/504,055

(22) Filed: Jul. 16, 2009

(65) Prior Publication Data

US 2011/0015771 A1 Jan. 20, 2011

(51) Int. Cl.
*G06F 19/00* (2011.01)
*G06F 9/44* (2006.01)

(52) U.S. Cl. ........................ 700/180; 717/129

(58) Field of Classification Search .............. 700/86, 700/87, 179, 180, 181, 185; 717/129
See application file for complete search history.

(56) References Cited

U.S. PATENT DOCUMENTS

| | | | |
|---|---|---|---|
| 5,276,811 A * | 1/1994 | Zifferer et al. | 703/25 |
| 6,397,111 B1 * | 5/2002 | Niwa | 700/11 |
| 6,498,962 B2 * | 12/2002 | Sugiyama et al. | 700/179 |
| 7,110,854 B2 | 9/2006 | Kajiyama | |
| 2007/0078538 A1 * | 4/2007 | Kawakami et al. | 700/87 |
| 2008/0052683 A1 * | 2/2008 | Bates et al. | 717/129 |

FOREIGN PATENT DOCUMENTS

JP 01152505 A * 6/1989

OTHER PUBLICATIONS

English Abstract of JP 01152505 A (Jun. 1989).*

* cited by examiner

*Primary Examiner* — Ryan Jarrett
(74) *Attorney, Agent, or Firm* — Westerman, Hattori, Daniels & Adrian, LLP

(57) ABSTRACT

A numerically controlling apparatus is provided in which the automatic operation of a machine tool can be stopped at a desired block and yet at plurality of desired blocks without changing NC programs. In this numerically controlling apparatus, an operator performs a change into the "EDIT" mode with a mode selecting switch on a keyboard 18 and makes the cursor shifted up to the block, at which the automatic operation is desired to be stopped, with the keyboard 18, in the state where the NC program for setting stop points is displayed in the image 20. By pushing the "SET STOP POINT" key 24A provided in the key display area 24, the stop point 25 indicated with a "red circle" is set ahead of the block. When, in the course of the automatic operation of the machine tool, the action due to the command of the block, for which the stop points 25 is set, has been completed, the automatic operation of the machine tool becomes stopped.

6 Claims, 4 Drawing Sheets

FIG.3

| Program number | Block number | NC block | Stop condition | Skip times |
|---|---|---|---|---|
| ... | | ... | ... | ... |
| 7700 | 8 | M10; | | 0 |
| 7700 | 16 | M08; | | 0 |
| 7700 | 100 | G00X0Y0; | | 2 |
| 7700 | 150 | G00X#100; | #100GE20 | |
| | | | | |
| ... | | ... | ... | ... |

NUMERICALLY CONTROLLING APPARATUS WITH STOP POINT SETTING AND REMOVING MEANS

TECHNICAL FIELD

The present invention relates to a numerically controlling apparatus for controlling a machine tool and specifically relates to a numerically controlling apparatus in which the automatic operation of a machine tool can be stopped at the determined position in an NC program in the course of the operation of the machine tool in an automatic operation mode.

BACKGROUND OF THE INVENTION

In a CNC machine tool, an NC program corresponding to a work to be machined is created and then a tool and fixing means are used for machining the work with automatic operation, In this regard, when machining is performed for the first time after creation of the NC program or for the first time after exchange of the work or fixing means, it is necessary to interrupt the automatic operation of the machine tool halfway and to perform jobs such as checking precision of the work, checking the tool length, cleaning out cut scraps, checking if the tool is damaged or not, checking the orientation of the nozzle for coolant or the like, so as to prevent errors in machining.

There are two common methods for stopping the automatic operation of a CNC machine tool at a desired position. The first is a method in which M00 (program stop) and M01 (optional stop) are used. For this method, M codes as M01 or M02 must be set at the desired stop position of the NC program. According to this, it is inevitable to change the position at which the M codes are set in the created NC program in order to change the position at which the automatic operation of the machine tool is stopped.

The second is a method in which the function of "Sequence Number Comparison and Stop" is used. In this method, the program number and sequence number, at which the automatic operation is desired to be stopped, are registered beforehand apart from the NC program.

By arranging in such a manner, automatic operation with the NC program is executed, the executed NC program comes to match the program number registered beforehand and then automatic operation of the machine tool can be stopped when the action by the block of the sequence number registered beforehand has been completed.

The aforementioned second method is more advantageous than the first method in that it is not necessary to change the NC program in order to change the position at which the automatic operation of the machine tool is stopped. However, the second method has two restrictions. The first restriction is such that only one position can be set in the NC program as the position at which the automatic operation is stopped. Even if the automatic operation of the machine tool is desired to be stopped at plurality of positions, there is no way to do this. The second restriction is such that there are blocks without sequence number in the NC program and the automatic operation of the machine tool can not be stopped at the block without sequence number.

Further, there is another, that is, the third method, which corresponds to the numerically controlling apparatus disclosed in U.S. Pat. No. 7,110,851 (patent document 1). In the numerically controlling apparatus disclosed in the patent document 1, an operator sets specific T codes or G codes, as codes for stopping the automatic operation of the machine tool, using a keyboard. When the action due to the command by the specific T codes or G codes has been completed in the course of the automatic operation by the NC program, the automatic operation of the machine tool is stopped, so that need for changing the NC program is eliminated.

However, in the aforementioned third method, the automatic operation of the machine tool can not be stopped at the block which does not contain T codes or G codes. Further in the third method, the automatic operation of the machine tool is necessarily stopped at the block with the specific T codes or G codes and so the automatic operation is stopped at the block for which there is no need for stopping the automatic operation, thus efficiency of operation being lowered.

SUMMARY OF THE INVENTION

It is an object of the present invention to provide a numerically controlling apparatus in which the automatic operation of a machine tool can be stopped at plurality of desired blocks without changing NC programs.

It is another object of the present invention to provide a numerically controlling apparatus in which the automatic operation of a machine tool can be stopped at any desired block without any sequence number.

It is still another object of the present invention to provide a numerically controlling apparatus in which the stop condition for stopping the automatic operation by blocks can be changed optionally without changing NC programs.

It is still another object of the present invention to provide a numerically controlling apparatus in which the automatic operation of a machine tool can be stopped after having repeated the action due to the command of the block for desired times without changing NC programs.

The aforementioned objects are fulfilled by the present invention with features according to the aspects specified as follows.

In the first aspect of the present invention, a numerically controlling apparatus is provided in which plurality of blocks constituting NC programs are read out sequentially to be analyzed and then the action due to the command of the blocks is carried out so as to perform the automatic operation of a machine tool, characterized in that:
said numerically controlling apparatus is equipped with
a program content display area for displaying the selected one of said NC programs in an image,
stop point setting means for setting stop points with determined marks in the desired blocks of the NC program displayed in said program content display area, and
stop point removing means for removing the stop points in the blocks for which the stop points are set;
and further characterized in that said NC program, for which setting of the stop point has been completed, is read out and then the automatic operation of the machine tool is stopped when the action due to the command of the block, for which said stop point is set, has been completed.

In the second aspect of the present invention, the numerically controlling apparatus in the first aspect is equipped with stop point table display means for displaying all the blocks, for each of which a stop point is set, as a stop point table in the image and further characterized in that program numbers, block numbers and program contents of the blocks, for which the stop points are set, are displayed in said stop point table.

In the third aspect of the present invention, the numerically controlling apparatus in the second aspect is arranged so that stop condition is also displayed in said stop point table and the automatic operation of the machine tool is stopped after the action due to the command of the block has been completed only when the program content, for which the stop points are set, matches the stop condition.

In the fourth aspect of the present invention, the numerically controlling apparatus in the third aspect is further equipped with stop condition setting means for setting desired value for the stop condition displayed in the stop point table.

In the fifth aspect of the present invention, the numerically controlling apparatus in the third aspect is arranged so that skip times are also displayed in the stop point table and the automatic operation of the machine tool can be stopped after the action due to the command of the block, for which skip times are set, has been repeated by the skip times and the action due to the command of said block has been completed.

In the sixth aspect of the present invention, the numerically controlling apparatus in the fifth aspect is further equipped with skips times setting means for setting desired values of skip times displayed in said stop point table.

In the numerically controlling apparatus according to the present invention, stop points with determined marks are set in the desired blocks of the NC program displayed in the program content display area, the NC program in which setting of stop points has been completed is read out and the automatic operation of the machine tool is stopped when action due to command of the block for which stop points are set has been completed. Accordingly, the automatic operation of the machine tool can be stopped at the desired block and yet at plurality of desired blocks when action due to command of the block for which stop points are set has been completed, without changing the NC program. Further, in the numerically controlling apparatus according to the present invention, the automatic operation of the machine tool can be stopped at any desired block or without sequence number.

BRIEF DESCRIPTION OF DRAWINGS

FIG. 3 shows a stop point table.

DETAILED DESCRIPTION OF EMBODIMENTS

Figure 1:
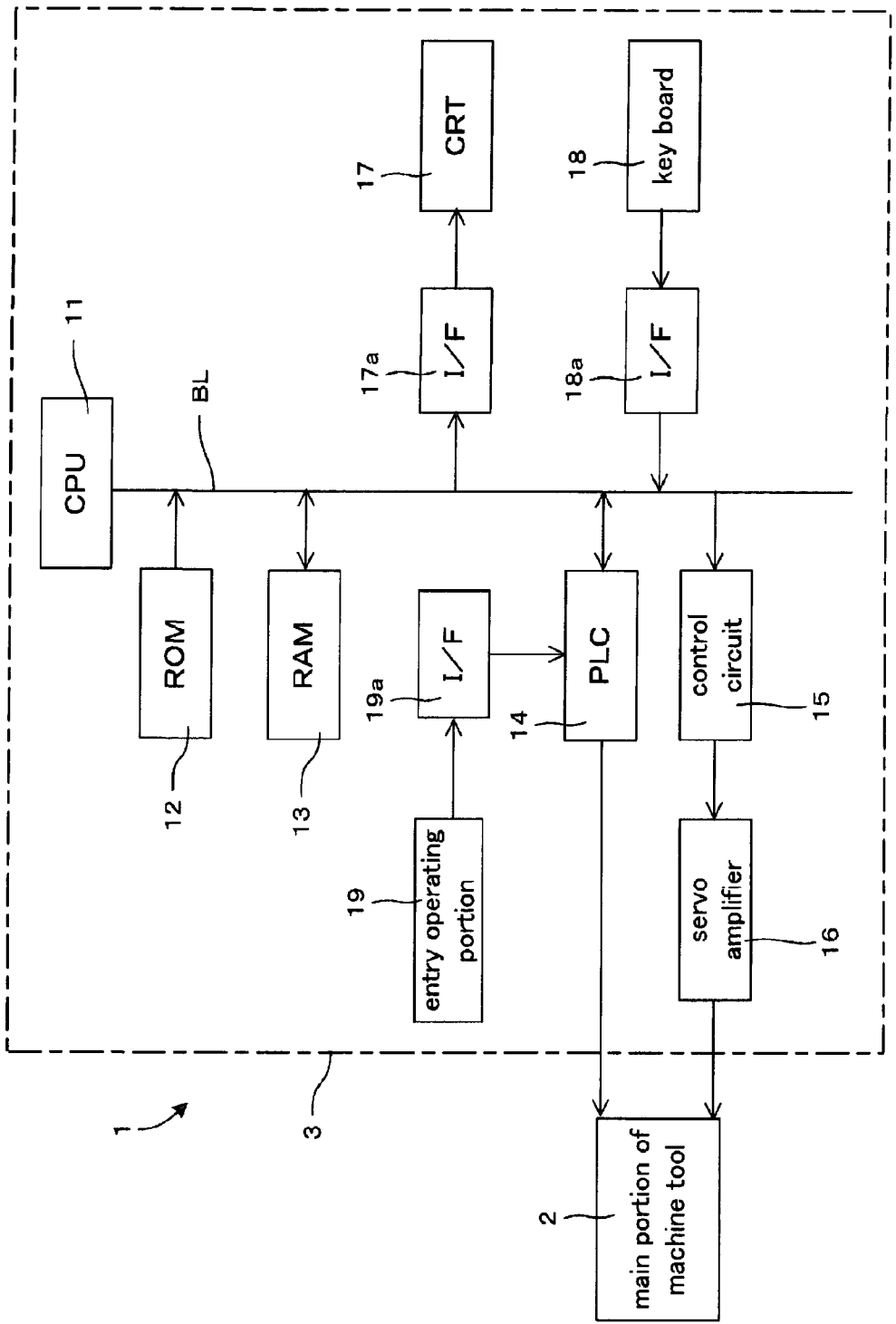
FIG. 1 is a block diagram showing a numerically controlling apparatus as an embodiment according to the present invention.
Figure 2:
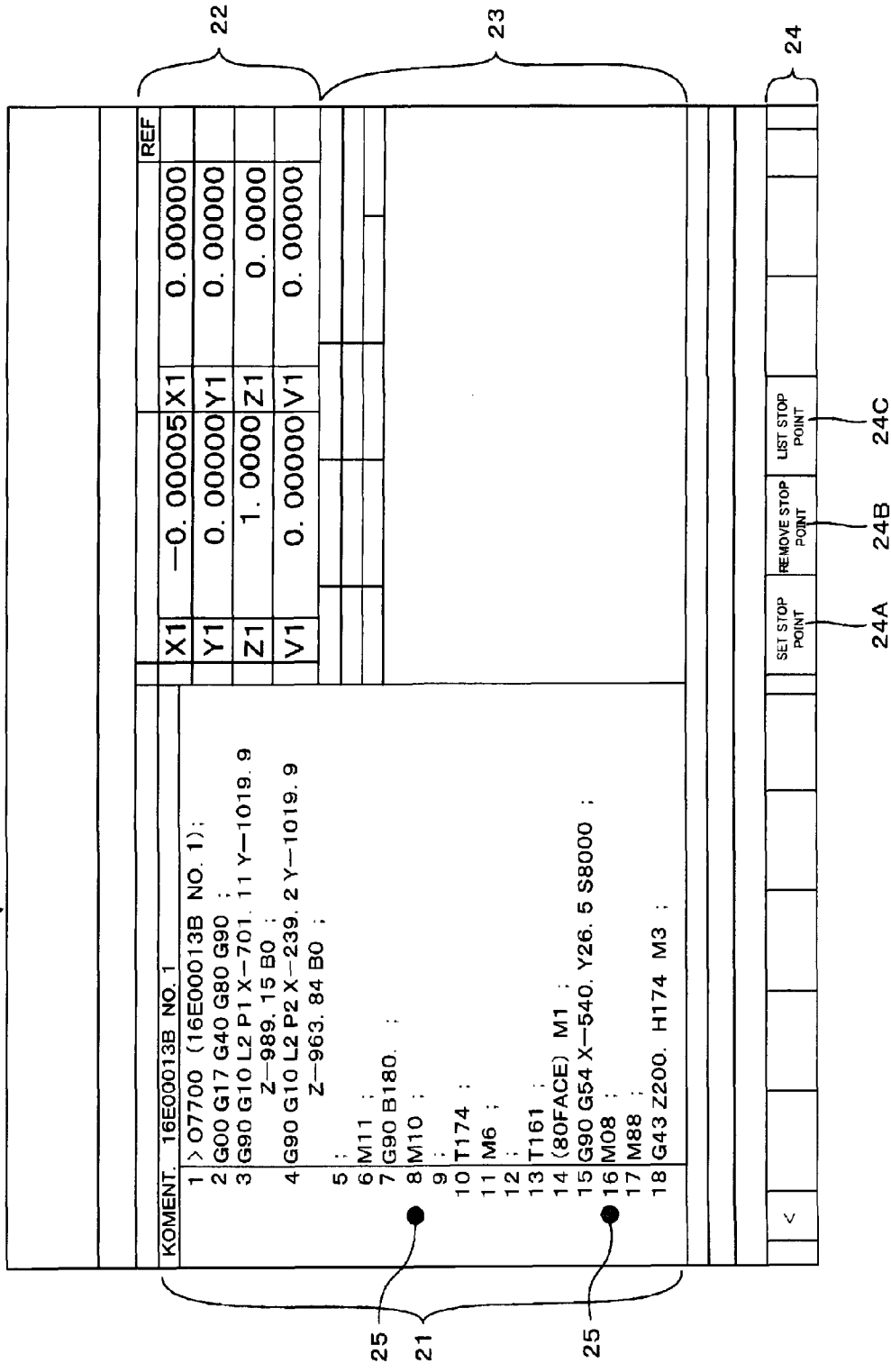
FIG. 2 shows an image displayed on the CRT of the numerically controlling apparatus in FIG. 1.

The present invention will be explained for its embodiment referring to drawings below. FIG. 1 is a block diagram showing a numerically controlling apparatus as an embodiment according to the present invention, FIG. 2 shows an image displayed on the CRT of the numerically controlling apparatus in FIG. 1 and FIG. 3 shows a stop point table.

As shown in FIG. 1, a CNC machine tool 1 is equipped with a main portion of a machine tool 2 and a numerically controlling apparatus 3 for controlling the operation of the main portion 2 of the machine tool. The numerically controlling apparatus 3 has a CPU 11 for making a total control of the numerically controlling apparatus 3, a ROM 12 for storing system programs, etc. and a RAM 13 for storing NC programs and modal information such as various parameters, correction values for tools and others.

A programmable logic controller (PLC) 14 controls the operation of the main portion 2 of the machine tool due to the command by M function or T function such as supply of cutting oil and its interruption or automatic exchange of tools, based on NC programs and others stored in the RAM 13.

The control circuit 15 controls the driving of a servo motor (not shown) mounted in the main portion 2 of the machine tool by putting out a command for axial movement and others to a servo amplifier 16 for driving the servo motor, receiving commands from CPU 11.

A CRT 17 displays a variety of information, such as the position along each axis, alarm, parameters or NC programs, on its screen according to the command from the CPU 11. A keyboard 18 is used by an operator for installing NC programs, performing entry or editing operations (e.g. changing the current employed NC program into another or correcting a part of the NC program by changing the position of the cursor in the NC program) or performing reset operation. The CRT 17 and keyboard 18 are connected via interfaces 17a and 18a to a bus line BL respectively and an entry operating portion 19 is connected via an interface 19a to the PLC 14.

Images 20 exhibiting information necessary for checking the NC program are displayed on the screen of the CRT 17. By changing image display mode of the image 20, various images 20 can be displayed and so it is possible to check the NC program from various points of view.

As shown in FIG. 2, the image 20 contains a program content display area 21, a coordinate display area 22 in which absolute coordinate values for respective axes and values of remnant movement are displayed and an operation information display area 23 in which operation information of various commands by the NC program and various actions carried out based on the various commands or the like are displayed. Further, at the underside of the image 20 is disposed a key display area 24 in which various soft keys for image handling are displayed.

The content of the NC program selected last is displayed in the program content display area 21 of this image 20. In such a case where the content of another NC program is desired to be displayed in the program content display area 21, an operator enters the number of the NC program with the keyboard 18, which causes the NC program of the entered number to be selected and then causes the content of another NC program to be displayed in the program content display area 21.

In order to stop automatic operation of the machine tool at the desired position of the NC program, a stop point is set in the NC program with the following procedure. That is, in the situation where the NC program is displayed so as to set a stop position in the image 20, the operator makes a change into the "EDIT" mode with the mode selecting switch (not shown) on the keyboard 18 and makes the cursor shifted up to the block, at which the operation is desired to be stopped, with the keyboard 18.

In the next place, by pushing the "SET STOP POINT" key 24A provided in the key display area 24, the stop point 25 indicated with a "red circle" is set ahead of the block (e.g. in the left side of the block number 8 in FIG. 2). The mark indicating the stop point 25 is not limited for a "red circle" but may be of any type for an operator to be able to recognize easily with his eyes, so that a mark or marks with any color or figure can be used.

If there is another block at which the operation is desired to be stopped, the operator makes the cursor shifted up to the block with the keyboard 18 and pushes the "SET STOP POINT" key 24A provided in the key display area 24. By doing so, the stop point 25 indicated with a "red circle" is set ahead of the block (e.g. in the left side of the block number 16 in FIG. 2). Repeating the handling, the stop points 25 can be set for all the blocks at which the automatic operation of the machine tool is desired to be stopped.

The procedure for removing the stop point 25 once set is as follows. That is, the operator makes the cursor shifted up to the block, for which the stop point 25 is desired to be removed, with the keyboard 18 and pushes the "REMOVE STOP POINT" key 24B provided in the key display area 24. By doing so, the stop point 25 indicated with a "red circle" ahead of the block is extinguished and the stop point 25 is removed.

When setting of stop points 25 for all the desired blocks has been completed, the operator makes a change into the "MEMORY" mode with the mode selecting switch (not shown) of the keyboard 18 and pushes the "CYCLE START" button (not shown), so as to cause the machine tool to be operated automatically. When, in the course of the automatic operation of the machine tool, the action due to the command of the blocks, for which the stop points 25 are set (e.g. the block of number 8 in FIG. 8), has been completed, the automatic operation of the machine tool becomes stopped.

When the automatic operation of the machine tool has been stopped, the operator performs necessary jobs such as checking tool length, cleaning out cut scraps, checking if the tool is damaged or not, checking the orientation of the nozzle for coolant or the like. When the operator pushes the "CYCLE START" button (not shown) of the keyboard 18 after those jobs have finished, the automatic operation of the machine tool starts again so that the operation due to the command of the next block (e.g. block of number 9 in FIG. 2) starts.

When the operator pushes the "LIST STOP POINT" key 24C provided in the key display area 24, all blocks with the stop points set by the operator can be displayed totally, as shown in the stop point table 30 in FIG. 3. The stop point table 30 is displayed in the operation information display area 23 in FIG. 2.

In the stop point table 30, the program numbers 31 are shown in the first column and the block numbers 32 are shown in the second column, as shown in FIG. 3. That is, because the stop points 25 are set not by use of the sequence numbers but by use of the block numbers according to the embodiment of the present invention, the automatic operation of the machine tool can be stopped at any desired block without a sequence number.

The third column of the stop point table 30 is for NC blocks 33 and the program contents of the blocks are shown there. The stop conditions 34 are shown in the fourth column of the stop point tale 30. If a stop condition has been set, the automatic operation of the machine tool can be stopped after the action due to the command of the block (e.g. the block number 150 in FIG. 3) has been completed, only when the stop condition set in the stop condition 34 matches the program content of the block. Setting of a stop condition is performed by making the cursor shifted up to position of the stop condition 34 of the block, for which setting of the stop condition is desired to be set, with the keyboard 18 and entering the stop condition with the keyboard 18.

In the example shown in FIG. 3, "#100GE20" is set as the stop condition for the block number 150. The stop condition "#100GE20" means that #100≧20. Accordingly, the automatic operation of the machine tool can be stopped after the action due to the command of the block number 150 has been completed, only when the value of the macro variable #100 in "G00X#100" described in the program of the program number 150 satisfies this stop condition (#100≧20).

The fifth column of the stop point table 30 is for skip times 35. The automatic operation of the machine tool can be stopped after the action due to the command of the block has been repeated by the digit number set in the skip times 35. Setting of the skip times is performed by making the cursor shifted up to position of the skip times 35 of the block, for which skip times are desired to be set, with the keyboard 18 and entering the desired skip times with the keyboard 18.

In other words, according to the embodiment of the present invention, the automatic operation of the machine tool can be stopped at the desired block and yet at plurality of desired blocks without changing the NC program. Further, the stop condition for stopping the automatic operation for the block can be changed optionally without changing the NC program, by setting the stop condition 34 optionally. Yet further, by setting the skip times optionally, the automatic operation of the machine tool can be stopped after having repeated the action due to the command of the block by the digit number set in the skip times 35, without changing the NC program.

Further, in case where actual machining is performed with the NC program in which stop points are set as above, it is not necessary to stop the automatic operation of the machine tool at the stop points. For this reason, it is possible to set system parameters for enabling or disabling the function of stop points with which automatic operation of the machine tool is stopped at the stop points. The system parameters are entered through operation of the keyboard 18 in relation to the image 20. If the system parameter for disabling the function of stop points has been set, the stop points which were set are ignored.

Figure 4:
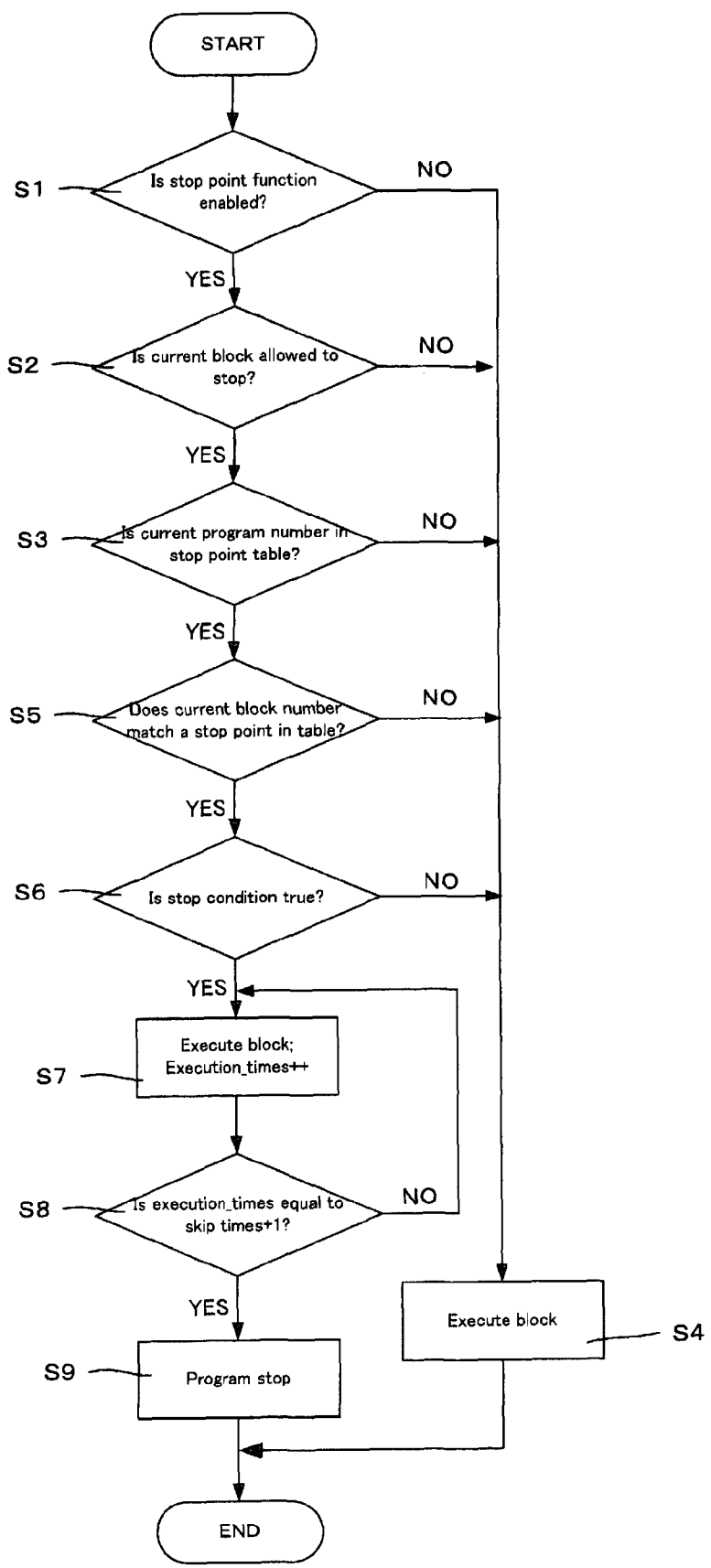
FIG. 4 is a stop point function flowchart showing the operation of the numerically controlling apparatus as an embodiment according to the present invention.

FIG. 4 is a flowchart showing the action of the numerically controlling apparatus according to the embodiment of the present invention. As shown in FIG. 4, checking is performed in step S1 if the stop point function is enabled or not. In case of "YES", advancement to step S2 is made. In case of "NO", advancement to S4 is made, the action due to the command of the block in the NC program being currently in execution is performed and the stop points are ignored.

Checking is performed in step S2 if single block stop is allowed or not for the block being currently in execution. In case of "YES", advancement to S3 is made. In case of "NO", with the stop point function being disabled, advancement to S4 is made, the action due to the command of the block of the NC program being currently in execution is performed and the stop points are ignored. That is, in case of the following specific blocks, single block stop is prohibited and the stop points are ignored.

In tapping mode G63,
In thread cutting G33/G34/G35/G36,
At middle point of 3-Dimention circular interpolation G02.4,
Figure copy G72.1/G72.2,
Macro call G65/G66/G66.1/G67,
Some other macro call using specific addresses,
Subprogram call M98/M198,
Subprogram return M99.
In milling:
Chopping G81.1,
Rigid tapping G74/G84.
In turning:
Rigid tapping G84/G88,
Multiple repetitive cycle G70-G76.

Checking is made in step S3 if the program number of the NC program being currently in execution is registered in the stop point table 30 or not. In case of "YES", advancement to step S5 is made. In case of "NO", with no stop point 25 in the NC program being currently in execution, advancement to step S4 is made and the action due to the command of the block of NC program being currently in execution is performed.

Checking is made in step S5 if current block number matches the block number registered in the stop point table 30 or not. In case of "YES", advancement to step S6 is made. In case of "NO", advancement to step S4 is made because there is no stop point 25 in the current NC program being in execution and the action due to the command of the current block is carried out.

Checking is made in steep S6 if the stop condition of the current block number matches the stop condition registered in the stop condition 34 of the stop point table 30 or not. In case of "YES", advancement to step S7 is made. In case of "NO", advancement to step S4 is made and the action due to the command of the current block is carried out.

The action due to the command of of the block of the current block number is carried out and the number of carried out actions is increased by one in the block in step S7. Checking is made in step S8 if the number of carried out actions for the block matches the skip times registered in the column of skip times 35 of the stop point table 30 or not. In case of "YES", advancement to Step S9 is made and the automatic operation is stopped. In case of "NO", with return to step S7 the number of carried out actions due to the command of the current block is increased.

What is claimed is:

1. A numerically controlling apparatus for controlling automatic operation of a machine tool, which comprises means for storing NC programs for controlling the operation of the machine tool, a programmable logic controller for controlling the maintenance operation of the machine tool and the operation of the machine tool and a control circuit for controlling the operation of the servomotor in the machine tool, and in which plurality of blocks constituting the NC programs are read out sequentially to be analyzed and then the action due to the command of the blocks is carried out, whereby the automatic operation of the machine tool is controlled, characterized in that:
   said numerically controlling apparatus is equipped with
   a program content display area for displaying the selected one of said NC programs in an image,
   stop point setting means for setting stop points and displaying determined marks indicating the stop points in the desired blocks of the NC program displayed in said program content display area, and
   stop point removing means for removing the stop points in the blocks for which the stop points are set;
   and further characterized in that, in automatic operation of the machine tool, the NC program, for which setting of the stop point has been completed, is read out so that the automatic operation of the machine tool is performed and the automatic operation of the machine tool is stopped when the action due to the command of the block, for which the stop points are set, has been completed.

2. A numerically controlling apparatus for controlling automatic operation of a machine tool according to claim 1, being equipped with stop point table display means for displaying all the blocks, for each of which a stop point is set, as a stop point table in the image and further characterized in that program numbers, block numbers and program contents of the blocks, for which the stop points are set, are displayed in said stop point table.

3. A numerically controlling apparatus for controlling automatic operation of a machine tool according to claim 2, wherein stop condition is also displayed in said stop point table and the automatic operation of the machine tool is stopped after the action due to the command of the block has been completed only when the program content, for which the stop points are set, matches the stop condition.

4. A numerically controlling apparatus for controlling automatic operation of a machine tool according to claim 3, further being equipped with stop condition setting means for setting desired value for the stop condition displayed in the stop point table.

5. A numerically controlling apparatus for controlling automatic operation of a machine tool according to claim 3, wherein skip times are also displayed in the stop point table and the automatic operation of the machine tool can be stopped after the action due to the command of the block, for which skip times are set, has been repeated by the skip times and the action due to the command of said block has been completed.

6. A numerically controlling apparatus for controlling automatic operation of a machine tool according to claim 5, further being equipped with skips times setting means for setting desired values of skip times displayed in said stop point table.

* * * * *